(12) United States Patent
Foisy et al.

(10) Patent No.: US 8,553,367 B1
(45) Date of Patent: Oct. 8, 2013

(54) DEPOPULATED HEAD STACK ASSEMBLY HAVING A NECKED DUMMY MASS

(75) Inventors: Gregory G. Foisy, Tracy, CA (US); Huijie Xu, Milpitas, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 555 days.

(21) Appl. No.: 12/190,326

(22) Filed: Aug. 12, 2008

(51) Int. Cl.
*G11B 5/55* (2006.01)
*G11B 21/08* (2006.01)

(52) U.S. Cl.
USPC ...................................... 360/265.7

(58) Field of Classification Search
USPC .......... 360/265.7, 265.9, 244.5, 244.6, 244.2
See application file for complete search history.

(56) References Cited

U.S. PATENT DOCUMENTS

| | | | |
|---|---|---|---|
| 4,346,416 A * | 8/1982 | Riggle et al. | 360/264.9 |
| 5,016,131 A * | 5/1991 | Riggle et al. | 360/264.7 |
| 5,187,626 A * | 2/1993 | Hopkins et al. | 360/265.9 |
| 5,296,984 A | 3/1994 | Fick | |
| 5,854,721 A * | 12/1998 | Lim | 360/264.1 |
| 5,905,608 A * | 5/1999 | Frees et al. | 360/265.9 |
| 5,946,164 A | 8/1999 | Tracy | |
| 6,166,886 A | 12/2000 | Toensing | |
| 6,349,464 B1 | 2/2002 | Codilian et al. | |
| 6,388,841 B1 | 5/2002 | Summers | |
| 6,502,300 B1 | 1/2003 | Casey et al. | |
| 6,532,137 B2 | 3/2003 | Huang et al. | |
| 6,538,853 B1 | 3/2003 | Williams et al. | |
| 6,661,615 B2 | 12/2003 | Tsuda | |
| 6,757,136 B2 | 6/2004 | Buske et al. | |
| 6,775,106 B1 | 8/2004 | Williams et al. | |
| 7,016,157 B1 | 3/2006 | Williams et al. | |
| 7,124,496 B2 | 10/2006 | Kashima et al. | |
| 7,417,830 B1 | 8/2008 | Kulangara | |
| 7,595,961 B2 | 9/2009 | Shimozato | |
| 7,952,835 B2 | 5/2011 | Lee et al. | |
| 2003/0218833 A1 * | 11/2003 | Nagahiro et al. | 360/265.9 |
| 2005/0157430 A1 * | 7/2005 | Korkowski et al. | 360/265.9 |
| 2005/0174695 A1 * | 8/2005 | Suk | 360/245.7 |

* cited by examiner

*Primary Examiner* — Joseph Feild
*Assistant Examiner* — Gustavo Polo

(57) ABSTRACT

A novel head stack assembly (HSA) is disclosed and claimed. The HSA includes first and second actuator arms. A first head gimbal assembly is attached to the first actuator arm. The first head gimbal assembly includes a read head. A dummy mass is attached to the second actuator arm. The dummy mass includes a mounting plate portion defining a mounting plate width, a neck portion defining a neck width and a neck length, and a distal mass portion defining a distal mass width and a distal mass length. The neck width is less than the mounting plate width and the neck width is less than the distal mass width.

21 Claims, 3 Drawing Sheets

DEPOPULATED HEAD STACK ASSEMBLY HAVING A NECKED DUMMY MASS

FIELD OF THE INVENTION

The present invention relates generally to information storage devices, and in particular to head stack assemblies used in disk drive information storage devices.

BACKGROUND

The typical hard disk drive includes a head disk assembly (HDA) and a printed circuit board (PCB) attached to a disk drive base of the HDA. The head disk assembly includes at least one disk (such as a magnetic disk, magneto-optical disk, or optical disk), a spindle motor for rotating the disk, and a head stack assembly (HSA). The printed circuit board assembly includes electronics and firmware for controlling the rotation of the spindle motor and for controlling the position of the HSA, and for providing a data transfer channel between the disk drive and its host.

The spindle motor typically includes a rotor including one or more rotor magnets and a rotating hub on which disks are mounted and clamped, and a stator. If more than one disk is mounted on the hub, the disks are typically separated by spacer rings that are mounted on the hub between the disks. Various coils of the stator are selectively energized to form an electromagnetic field that pulls/pushes on the rotor magnet(s), thereby rotating the hub. Rotation of the spindle motor hub results in rotation of the mounted disks.

The head stack assembly typically includes an actuator, at least one head gimbal assembly (HGA), and a flex cable assembly. During operation of the disk drive, the actuator must rotate to position the HGAs adjacent desired information tracks on the disk. The actuator includes a pivot-bearing cartridge to facilitate such rotational positioning. The pivot-bearing cartridge fits into a bore in the body of the actuator. One or more actuator arms extend from the actuator body. An actuator coil is supported by the actuator body, and is disposed opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk dive is not in use.

Each HGA includes a head for reading and writing data from and to the disk. In magnetic recording applications, the head typically includes an air bearing slider and a magnetic transducer that comprises a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on to an adjacent disk surface. The head is adhered to a suspension assembly that includes a gimbal, load beam, bend region, and swage plate. The suspension acts to preload the head against the surface of the disk. The preload force is often referred to as the "gram load." Each HGA is attached to the distal end of one of the actuator arms, typically by an attachment process known as "swaging" that involves forcing a slightly oversized ball through a boss in the swage plate to cause the boss to plastically expand within a hole in a corresponding actuator arm.

Generally, the greatest data capacity for a given disk drive design is obtained when there is at least one HGA corresponding to each disk surface, so that there are two HGAs swaged to each actuator arm between disks, and one HGA swaged on each of the uppermost and lowermost actuator arms. This condition is referred to in the art as a "fully populated" disk drive. For example, if a disk drive has a spindle hub that is designed to accommodate three disks, then its actuator would most likely be designed to have four arms (an uppermost arm, two "middle arms" between disks, and a lowermost arm), and such a disk drive would be considered "fully populated" if it included three disks and six HGAs (two swaged to each of the middle arms and one swaged to each of the uppermost and lowermost arms).

Yet not all disk drive customers require or want to pay for the greatest data capacity that a given disk drive design can provide, and the HGA and disk components are among the most expensive components in the disk drive. Therefore, it is commercially advantageous to the disk drive manufacturer to offer so-called "depopulated" versions of a disk drive design, in which one or more HGAs and/or disks are intentionally absent. For example, with reference to the previously described disk drive design that can accommodate three disks and six HGAs, one of the disks and two of the HGAs might be intentionally left out of the assembly to create a less expensive disk drive with $\frac{2}{3}^{rds}$ the data capacity of the fully-populated version.

A special clamp or disk spacers of a different thickness might be necessary to compensate for the absence of the omitted disk on the spindle hub. Nevertheless, the total cost of engineering development of a family of depopulated disk drives (all based on a single disk drive design for the highest data capacity target) is far lower than would be the cost of independent engineering development of a different design for each of the lower data capacities that might be achieved by depopulation. Therefore, depopulating disk drives is typically the most efficient and practical way for disk drive manufacturers to competitively meet a broad spectrum of customer requirements related to price and data capacity. Accordingly, depopulation may significantly increase disk drive sales without prohibitively increasing engineering development costs.

However, the absence of one or more HGAs on a subset of actuator arms can change the center of gravity of the HSA relative to where the center of gravity would be if the HSA were fully populated. To alleviate this problem, simple dummy masses have been swaged to the actuator arms as a substitute for each absent HGA in depopulated HSAs. Still, even with the dummy masses the dynamic characteristics of the depopulated HSA may be sufficiently different to affect dynamic control by the servo system, which in turn may lead to reduced servo bandwidth and impaired data track seeking and following functionality, possibly even increasing data access times and/or error rates when reading and writing data.

Accordingly, there is a need in the art for improved dummy masses for use in depopulated HSAs.

SUMMARY

A novel head stack assembly (HSA) is disclosed and claimed. The HSA includes first and second actuator arms. A first head gimbal assembly is attached to the first actuator arm. The first head gimbal assembly includes a read head. A dummy mass is attached to the second actuator arm. The dummy mass includes a mounting plate portion defining a mounting plate width, a neck portion defining a neck width and a neck length, and a distal mass portion defining a distal mass width and a distal mass length. The neck width is less than the mounting plate width and the neck width is less than the distal mass width.

DESCRIPTION OF THE PREFERRED EMBODIMENTS

Figure 1:
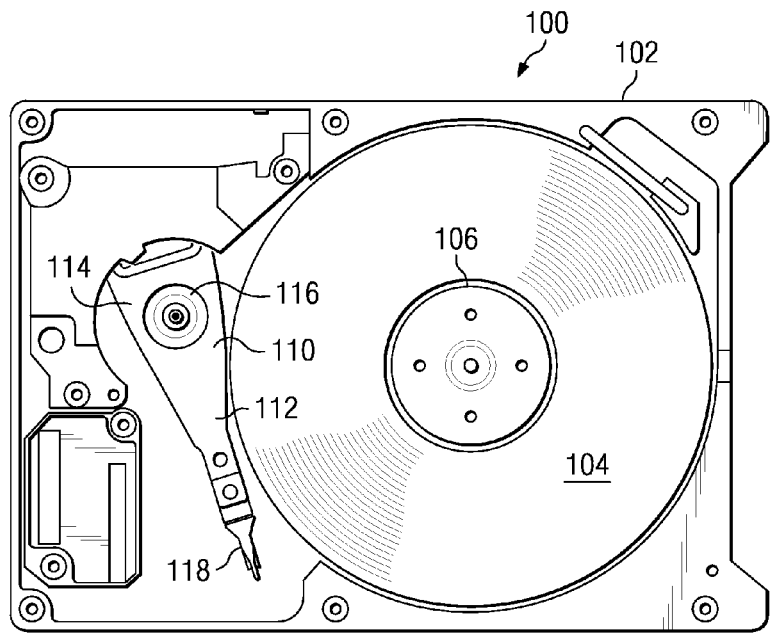
FIG. 1 depicts a head disk assembly (HDA) of a disk drive that is capable of incorporating an embodiment of the present invention.

FIG. 1 depicts a head disk assembly (HDA) 100 of a disk drive that is capable of incorporating an embodiment of the present invention. HDA 100 includes a disk drive base 102. At least one disk 104 is rotably mounted to the disk drive base 102 via spindle motor 106. A head stack assembly (HSA) 110 is rotably mounted to the disk drive base 102 via an actuator pivot 116. The head stack assembly includes an actuator body 114 from which a plurality of arms 112 extend. At least one HGA 118 is mounted to the distal end of each of the plurality of actuator arms 112. The opposite end of each of the plurality of actuator arms 112 is a supported end adjoining the actuator body 114. In certain embodiments, the actuator body 114 may be fabricated of a metal material such as aluminum, stainless steel, magnesium, beryllium, or an alloy thereof, by casting, extrusion, and/or forging.

Figure 2A:
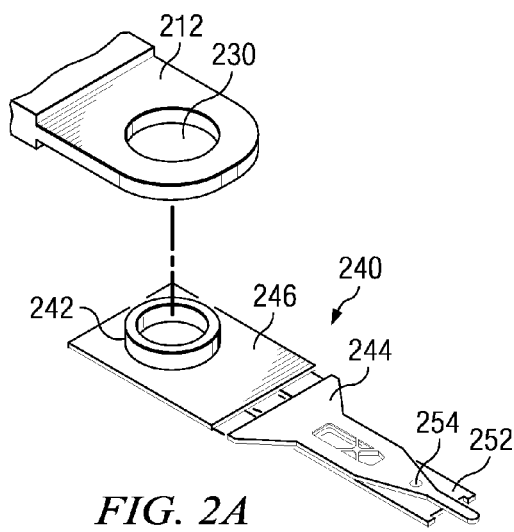
FIG. 2A depicts a head gimbal assembly (HGA) with its swaging boss aligned with an actuator arm swaging hole.

FIG. 2A depicts a head gimbal assembly (HGA) 240 and a distal region of an actuator arm 212. The HGA 240 has a flexure 252 and head (smaller and underneath flexure 252 in this view, and therefore not visible in FIG. 2A), a load beam 244, and a swage mount 246 having a raised annular swaging boss 242 adapted to fit within the swaging hole 230. The load beam 244 may include a conventional dimple 254 that protrudes towards the flexure 252 at the location of the head, to facilitate angular compliance of the head relative to the load beam 244. Alternatively the dimple may protrude from the flexure 252 away from the head and towards the load beam 244. The load beam 244, the swage mount 246, and the flexure 252 may be together considered as a suspension assembly. Suspension assemblies may be classified by the distance between the dimple 254 and the swaging boss 242 (with 11 mm and 12.6 mm being conventional classifications of this type).

The head includes a transducer for reading and/or writing data from/to a surface of a recording media (e.g. disk 104). In magnetic recording hard disk drive applications, the read transducer may be a magneto resistive sensor, and the write transducer may be a longitudinal or perpendicular magnetic writer. In optical recording applications, the head may include an objective lens for focusing laser light upon the recording media surface.

In FIG. 2A, the raised annular boss 242 is shown to be aligned with the swaging hole 230 prior to insertion. Swaging is an attachment process that depends upon plastic deformation of the annular boss 242. First the annular boss 242 is inserted into the swaging hole 230 in the distal portion of corresponding actuator arm 212, and then a slightly oversized interfering ball (not shown) is forced through the annular boss 242 causing it to plastically expand within the swaging hole 230. The plastic expansion of the annular boss 242 causes a permanent radial interference between the annular boss 242 and the swaging hole 230, thereby attaching the swaging plate 246 of the suspension assembly to the actuator arm 212.

Figure 2B:
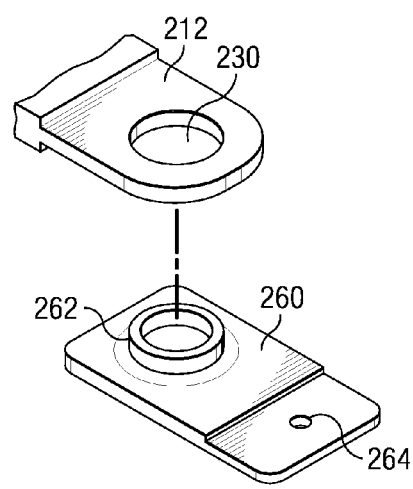
FIG. 2B depicts a contemporary dummy mass with its swaging boss aligned with an actuator arm swaging hole.

FIG. 2B depicts a contemporary dummy mass 260 with its swaging boss 262 aligned with the swaging hole 230 of the distal region of an actuator arm 212. Contemporary dummy mass 260 is rectangular in shape. Other contemporary dummy masses have been circular in shape. Contemporary dummy mass 260 includes a tooling hole 264 to facilitate positioning during assembly.

Figure 2C:
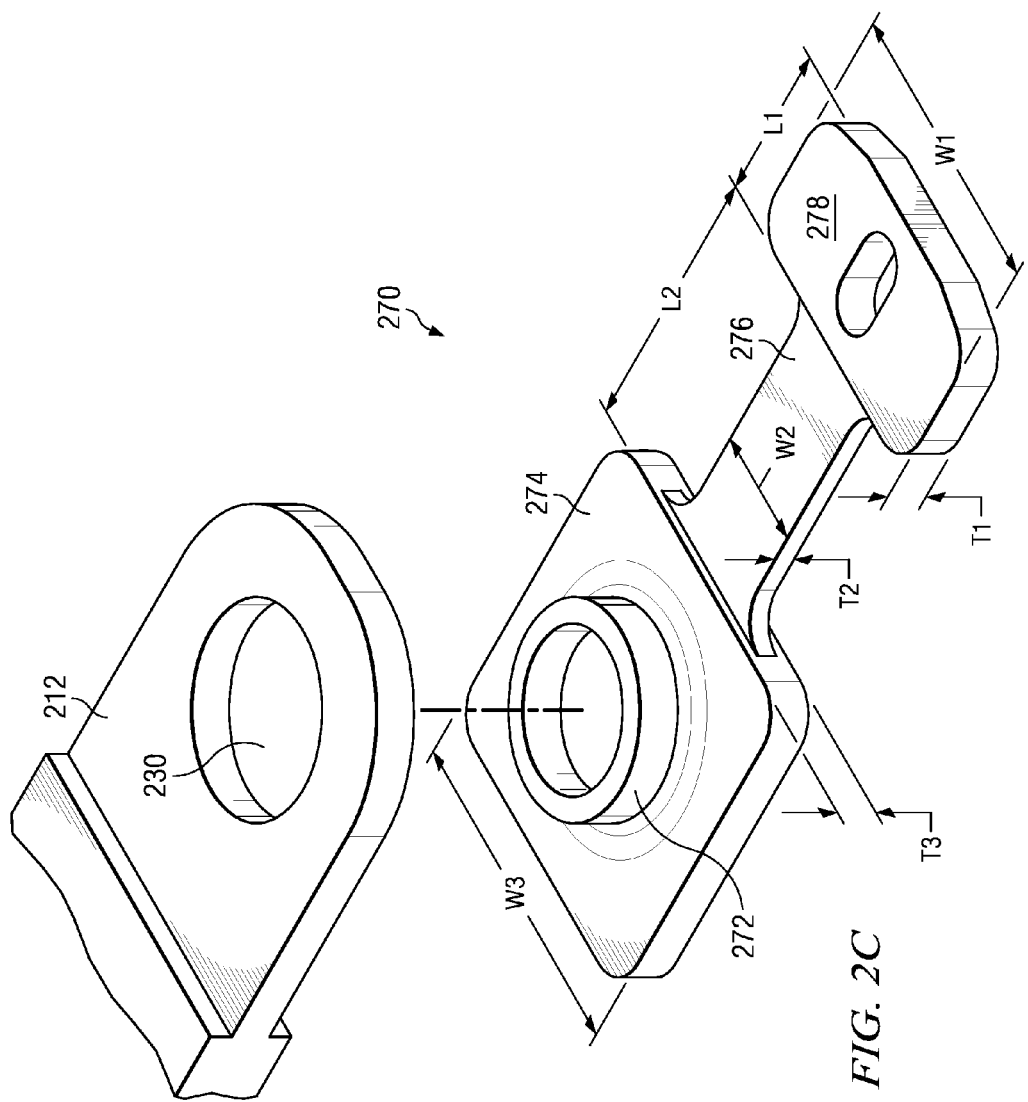
FIG. 2C depicts a dummy mass according to an embodiment of the present invention, with its swaging boss aligned with an actuator arm swaging hole.

FIG. 2C depicts a dummy mass 270 according to an embodiment of the present invention, with its swaging boss 272 aligned with the swaging hole 230 of the distal region of an actuator arm 212. Dummy mass 270 includes a mounting plate portion 274 defining a mounting plate width W3. Dummy mass 270 also includes a neck portion 276 defining a neck width W2 and a neck length L2. Dummy mass 270 also includes a distal mass portion 278 defining a distal mass width W1 and a distal mass length L1. Note that the dummy mass 270 does not include any read/write head, which is why the dummy mass is significantly cheaper than an HGA and why the dummy mass 270 qualifies as a "dummy mass" as distinguished from an HGA.

In the embodiment of FIG. 2C, the neck portion 276 is narrower than the mounting plate portion 274 and the neck portion 276 is narrower than the distal mass portion 278. That is, W2<W3, and W2<W1. This dimensional inequality may lower lateral vibration frequency modes of the dummy mass 270 sufficiently to enable the dummy mass 270 to function as a tuned resonator for lateral vibration modes in certain embodiments. As shown in FIG. 2C, the neck portion 276 is disposed between the mounting plate portion 274 and the distal mass portion 278, and the neck portion 276 connects the mounting plate portion 274 to the distal mass portion 278.

Preferably but not necessarily, the dummy mass 270 may be fabricated of stainless steel. In this case, the neck thickness T2 is preferably in the range 0.1 mm to 0.3 mm, the distal mass thickness T1 is preferably in the range 1 mm to 5 mm, and the neck length L2 is preferably in the range 3 mm to 6 mm for 11 mm class suspension assemblies, and 3.4 mm to 6.9 mm for 12.6 mm class suspension assemblies. Also in this case, the neck width W2 is preferably in the range 1.5 mm to 3 mm for 11 mm class suspension assemblies, and 1.7 mm to 3.4 mm for 12.6 mm class suspension assemblies. Also in this case, the distal mass length L1 is preferably in the range 2 mm to 5 mm for 11 mm class suspension assemblies, and 2.3 mm to 5.7 mm for 12.6 mm class suspension assemblies. Also in this case, the distal mass width W1 is preferably in the range 3 mm to 6 mm for 11 mm class suspension assemblies, and 3.4 mm to 6.9 mm for 12.6 mm class suspension assemblies. These dimensions may serve to tune the vibration of the dummy mass 270, especially in the torsional and sway modes of vibration. That is, these dimensions may give the dummy mass 270 dynamic characteristics that may render the frequency response function of the depopulated HSA to more closely mimic the frequency response function of the fully populated HSA.

In a lower cost embodiment of the present invention, the neck thickness T2 may be equal to the distal mass thickness T1. In such an embodiment, the neck thickness T2 and the distal mass thickness T1 are preferably but not necessarily equal to the mounting plate thickness T3, and the neck width W2 (if stainless steel) is preferably in the lower half of the range given above.

Figure 3A:
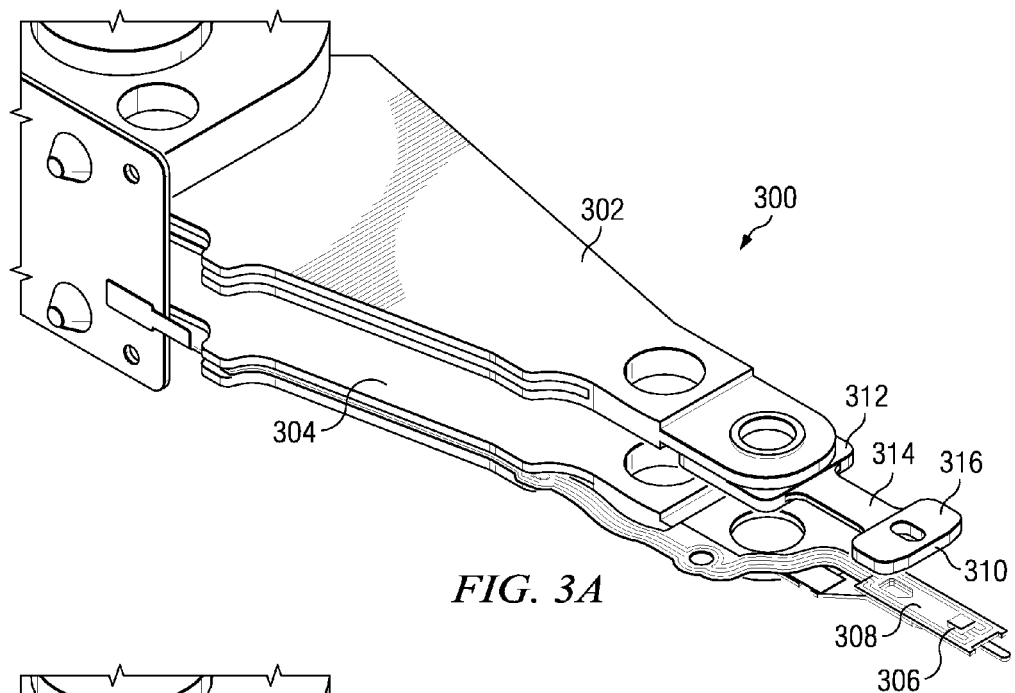
FIG. 3A depicts a depopulated HSA according to an embodiment of the present invention.

FIG. 3A depicts a depopulated HSA 300 according to an embodiment of the present invention. Depopulated HSA 300 is suitable for a disk drive design that can accommodate only a single disk, and the use of depopulated HSA 300 gives the disk drive approximately half of the data storage capacity than it would have with a fully populated HSA. HSA 300 includes a first actuator arm 304 and a second actuator arm 302. A first head gimbal assembly 308 is attached to the first actuator arm 304. The first head gimbal assembly 308 includes a read head 306. A dummy mass 310 is attached to the second actuator arm 302. The dummy mass 310 includes a mounting plate portion 312, a neck portion 314, and a distal mass portion 316. In the embodiment of FIG. 3A, the neck portion 314 is narrower than the mounting plate portion 312, and the neck portion 314 is narrower than the distal mass portion 316.

Figure 3B:
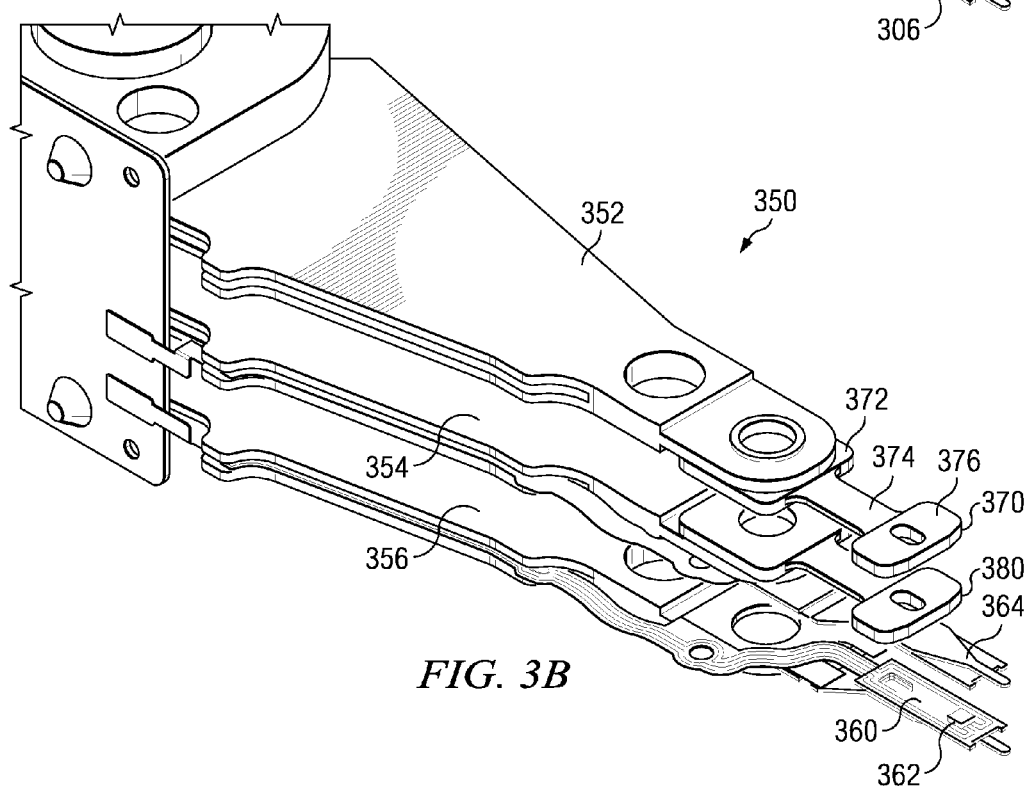
FIG. 3B depicts a depopulated HSA according to another embodiment of the present invention.

FIG. 3B depicts a depopulated HSA 350 according to another embodiment of the present invention. Depopulated HSA 350 is suitable for a disk design that can accommodate two disks, but depopulated HSA 350 has been configured for a depopulated disk drive in which the upper one of the two disks is intentionally absent. Specifically, HSA 350 includes a lowermost first actuator arm 356, a middle actuator arm 354, and an uppermost second actuator arm 352. A first head gimbal assembly 360 is attached to the first actuator arm 356. The first head gimbal assembly 360 includes a read head 362. A second head gimbal assembly 364 is attached to the middle actuator arm 354.

A first dummy mass 370 is attached to the second actuator arm 352. The first dummy mass 370 includes a mounting plate portion 372, a neck portion 374, and a distal mass portion 376. In the embodiment of FIG. 3B, the neck portion 374 is narrower than the mounting plate portion 372, and the neck portion 374 is narrower than the distal mass portion 376. Also in the embodiment of FIG. 3B, a second dummy mass 380 is attached to the middle actuator arm 354. Accordingly, the use of depopulated HSA 350, along with the intentional omission of the upper of two disks, would give a corresponding disk drive approximately 50% of the data storage capacity that it would have with a fully populated HSA and with both disks present. Of course, depending on the number of HGAs replaced by dummy masses in the embodiment of FIG. 3B, other data storage capacities are also practically obtainable (e.g. 25% data storage capacity if HGA 364 or 362 were also replaced by a dummy mass, or 75% data storage capacity if another HGA were included instead of either dummy mass 370 or 380 (and both disks were included in the disk drive).

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended as open-ended terms.

We claim:

1. A partially depopulated head stack assembly (HSA) comprising:
   first and second actuator arms;
   a first head gimbal assembly attached to the first actuator arm, the first head gimbal assembly including a read head;
   a dummy mass not having a read/write head, wherein the dummy mass is attached to a distal end of the second actuator arm, the dummy mass including
   a mounting plate portion defining a mounting plate width;
   a neck portion defining a neck width and a neck length; and
   a distal mass portion defining a distal mass width and a distal mass length;
   wherein the neck width is less than the mounting plate width and the neck width is less than the distal mass width; and
   wherein the neck portion is disposed between the mounting plate portion and the distal mass portion, and the neck portion connects the mounting plate portion to the distal mass portion
   wherein the mounting plate width, the neck width, the neck length, the distal mass width and the distal mass length are selected in accordance to one or more dimensions of the first head gimbal assembly, such that the partially depopulated HSA has dynamic characteristics similar to those of a fully populated HSA.

2. The HSA of claim 1 wherein the dummy mass is attached to the second actuator arm via a swage connection, and the mounting plate portion includes a raised annular swaging boss.

3. The HSA of claim 1 wherein the neck length is in the range 3 mm to 6.9 mm.

4. The HSA of claim 1 wherein neck width is in the range 1.5 mm to 3.4 mm.

5. The HSA of claim 1 wherein the distal mass length is in the range 2 mm to 5.7 mm.

6. The HSA of claim 1 wherein distal mass width is in the range 3 mm to 6.9 mm.

7. The HSA of claim 1 wherein the neck portion further defines a neck thickness, and the neck thickness is in the range 0.1 mm to 0.3 mm.

8. The HSA of claim 1 wherein the distal mass portion further defines a distal mass thickness, and the distal mass thickness is in the range 0.1 mm to 0.5 mm.

9. A head stack assembly (HSA) comprising:
   first and second actuator arms;
   a first head gimbal assembly attached to the first actuator arm, the first head gimbal assembly including a read head; and
   a dummy mass not having a read/write head, wherein the dummy mass is attached to a distal end of the second actuator arm, the dummy mass including a means for vibrational tuning of the dummy mass and a hole that is aligned with a hole on the first head gimbal assembly attached to the first actuator arm.

10. The HSA of claim 1 wherein the neck portion further defines a neck thickness and the distal mass portion further defines a distal mass thickness, and wherein the neck thickness is equal to the distal mass thickness.

11. The HSA of claim 10 wherein the neck portion further defines a neck thickness and the mounting plate further defines a mounting plate thickness, and wherein the neck thickness is equal to the mounting plate thickness.

12. The HSA of claim 1 wherein the neck portion further defines a neck thickness and the mounting plate further defines a mounting plate thickness, and wherein the neck thickness is equal to the mounting plate thickness.

13. A disk drive comprising:
a disk drive base;
a disk rotably mounted to the disk drive base;
a partially depopulated head stack assembly (HSA) rotably mounted to the disk drive base, the HSA comprising first and second actuator arms;
a first head gimbal assembly attached to the first actuator arm, the first head gimbal assembly including a read head; and
a dummy mass not having a read/write head, wherein the dummy mass is attached to a distal end of the second actuator arm, the dummy mass including
a mounting plate portion defining a mounting plate width;
a neck portion defining a neck width and a neck length; and
a distal mass portion defining a distal mass width and a distal mass length;
wherein the neck width is less than the mounting plate width and the neck width is less than the distal mass width; and
wherein the neck portion is disposed between the mounting plate portion and the distal mass portion, and the neck portion connects the mounting plate portion to the distal mass portion
wherein the mounting plate width, the neck width, the neck length, the distal mass width and the distal mass length are selected in accordance to one or more dimensions of the first head gimbal assembly, such that the partially depopulated HSA has dynamic characteristics similar to those of a fully populated HSA.

14. The disk drive of claim 13 wherein the dummy mass is attached to the second actuator arm via a swage connection, and the mounting plate portion includes a raised annular swaging boss.

15. The disk drive of claim 13 wherein the neck portion further defines a neck thickness and the distal mass portion further defines a distal mass thickness, and wherein the neck thickness is equal to the distal mass thickness.

16. The disk drive of claim 15 wherein the neck portion further defines a neck thickness and the mounting plate further defines a mounting plate thickness, and wherein the neck thickness is equal to the mounting plate thickness.

17. The disk drive of claim 13 wherein the neck portion further defines a neck thickness and the mounting plate further defines a mounting plate thickness, and wherein the neck thickness is equal to the mounting plate thickness.

18. The HSA of claim 1 wherein the distal mass portion comprises a hole, and wherein the neck length is of a length such that the hole is aligned with a hole on the first head gimbal assembly attached to the first actuator arm.

19. The HSA of claim 18 wherein the center of the hole of the distal mass portion is at the midpoint of the distal mass length.

20. The disk drive of claim 13 wherein the distal mass portion comprises a hole, and wherein the neck length is of a length such that the hole is aligned with a hole on the first head gimbal assembly attached to the first actuator arm.

21. The disk drive of claim 20 wherein the center of the hole of the distal mass portion is at the midpoint of the distal mass length.

* * * * *